Oct. 27, 1942. J. K. LUND 2,300,300
CARBONATING DEVICE
Filed March 16, 1939
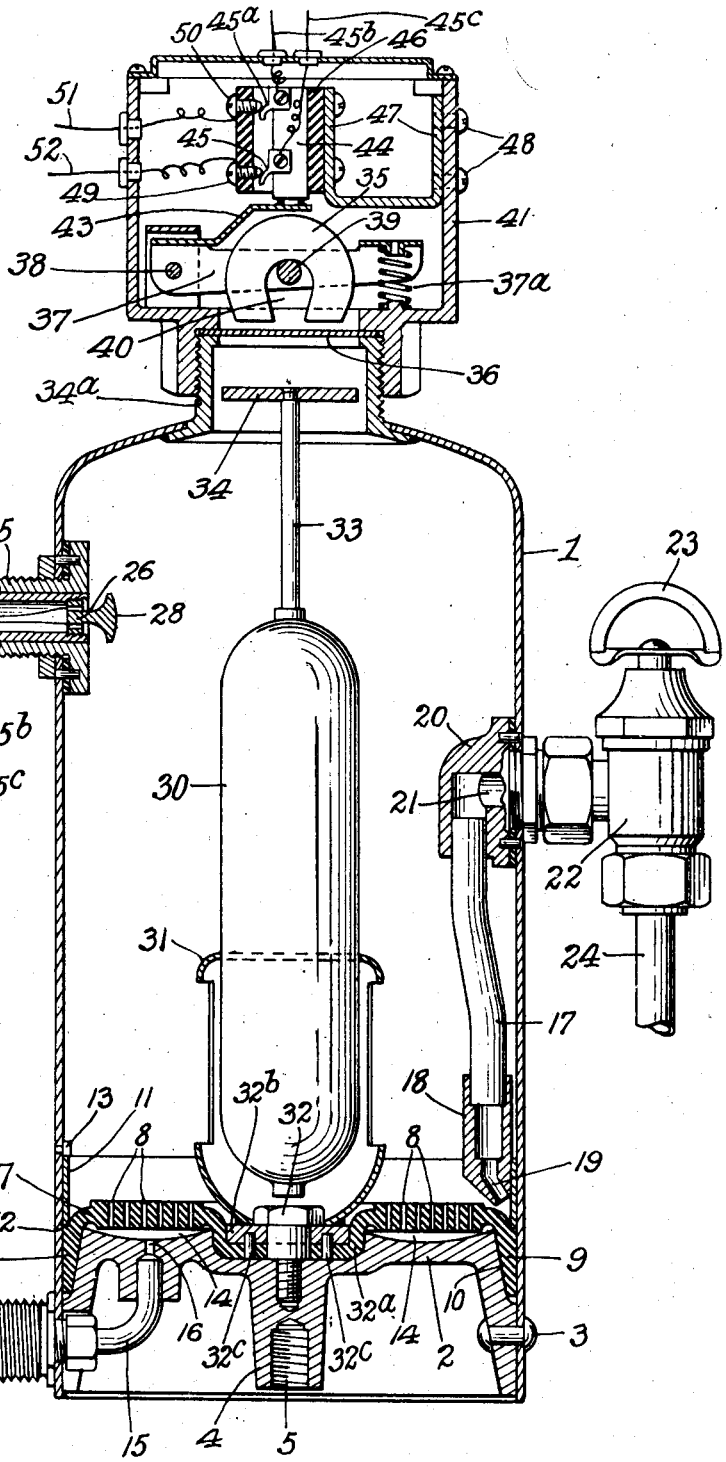
INVENTOR.
James K. Lund.
BY Parker Carter
ATTORNEYS.

Patented Oct. 27, 1942

2,300,300

UNITED STATES PATENT OFFICE 2,300,300

CARBONATING DEVICE

James K. Lund, Oak Park, Ill., assignor to The Dole Valve Company, Chicago, Ill., a corporation of Illinois Application March 16, 1939, Serial No. 262,197

3 Claims. (Cl. 261—26)

This invention relates to carbonating devices and has for its object to provide a new and improved device of this description.

The invention has as a further object to provide a carbonating device for carbonating water or other beverages, wherein there is an external control for controlling the water level in the carbonating device.

The invention has as a further object to provide a carbonating device wherein the water inlet and the gas inlet have no valves, there being only one movable part inside the receptacle. The invention has as a further object to provide a carbonating device wherein the liquid is delivered at a constant pressure.

The invention has as a further object to provide a carbonating device which shall be cheap to manufacture, efficient in operation and substantially free from service troubles.

The invention has other objects which are more particularly pointed out in the accompanying description.

Referring now to the drawing, Fig. 1 is a sectional view showing one form of carbonating device embodying my invention; and Fig. 2 is a diagrammatic view showing the circuit connections between the carbonator and the motor and pump.

Like numerals refer to like parts throughout the several figures.

Referring now to the drawing, in this construction there is a carbonating receptacle 1 into which the carbonated gas and the liquid to be carbonated are inserted. This receptacle has in the bottom a supporting device 2 which is preferably fastened to the wall of the receptacle by suitable fastening devices 3. There is a central projection 4 on the supporting device, which is provided with a threaded aperture 5 for fastening the device to a suitable base. The receptacle is provided with an inlet 6 for the gas, which in this case would be carbon dioxide.

On top of the support there is a disc 7 which is preferably of rubber and which is provided with a large number of small holes 8. This rubber disc may be of any suitable form and as herein shown is provided with an annular wall 9 which engages the inner wall of the receptacle and which is located between the receptacle and the face 10 of the support 2. There is a holding ring 11 inside of the receptacle 1 which engages a shoulder 12 on the disc 7. The holding ring 11 is held against movement by suitable holding devices 13.

There is an annular space 14 between the disc 7 and the supporting device 2. The gas from the inlet passes through the pipe 15 and up through the opening 16 in the supporting device 2 and into the annular space 14, which extends entirely around the support 2, and then passes up through the fine openings 8 in the disc 7 and into the liquid in the receptacle, so as to carbonize this liquid, which may be water or any liquid desired to be used as a beverage. The carbonized liquid is then drawn off through a pipe 17 which extends down on the inside of the receptacle to a point near the bottom thereof, having an admission member 18 with an admission opening 19. This pipe 17 connects with a member 20 on the inside of the receptacle, which has a passageway 21 communicating with the valve casing 22 which contains a valve operated by the handle 23. A pipe 24 leads from this valve to the point of use. It will be seen that by means of this arrangement, the carbonized water or other liquid is drawn off from the bottom of the receptacle, so as to prevent the drawing off of atmospheric air which accumulates in the top of the receptacle. This discharge mechanism is also placed near enough to the base of the receptacle so as to enable the assembler to get his hands in to make his tubing and other connections with the dispenser or other device where the carbonated liquid is used.

The liquid inlet is shown at 25 and is connected to any suitable source of liquid. This inlet is provided with a nozzle member consisting of a disc 26 in the admission opening, provided with a series of small openings 27 through which the liquid passes, the liquid striking the distributing member 28 so as to be sprayed into the gas above the liquid level. This arrangement provides two means of carbonating the liquid, one being the spraying of the liquid into the body of gas above the liquid level and the other being the passing of the gas through the body of liquid in the bottom of the receptacle.

There is a float 30 inside of the receptacle 1 which is loosely mounted in a guide 31. This guide is fastened to the support 2 by the fastening device 32. The disc 7 is depressed at its center into the recessed central portion of the support 2, as shown at 32a. The fastening device 32 acts to fasten the guide 31 and the disc 7 in position, there being an intermediate member 32b between the guide 31 and the support 2. This member preferably has projections 32c which pass through the depressed portion 32a of the disc 7, so as to securely hold it in position against lateral movement.

The float 30 has connected therewith a member 33 to which is connected a piece 34 of magnetic material. The receptacle 1 is preferably provided with a reduced portion 34a into which the piece 34 of magnetic material is received. A magnet 35, of any desired form or shape, is located above the piece 34 of magnetic material and there is preferably a piece 36 of non-magnetic material closing the upper end of the receptacle. The magnet 35 is supported on a lever 37 which is pivoted at 38. This magnet is preferably loosely supported on the lever by means of a member 39 attached to the lever and which extends into a space 40, as clearly shown, so that the magnet hangs on this member 39. The movement of this magnet controls an electric switch which controls the pump for pumping the water or other liquid entering through the liquid inlet 25. This switch and magnet and associated parts are preferably located in a casing 41, which is separate from the receptacle 1, but attached thereto in any desired manner, as by a screwthreaded engagement with the reduced portion 34a. The magnet 35 and associated parts are free to move up and down.

Attached to the lever 37 so as to move therewith is a control arm 43 which is attached to an insulated contact control member 44, carrying electrical contacts 45, 45a, preferably spring contacts, and which are mounted in an insulating cover 46 which may be supported in any desired manner, as by means of the bracket 47 attached to the casing 41 by the fastening devices 48. The contacts 45 and 45a are connected to a suitable source of electric supply by the conductors 45b and 45c.

Associated with the contacts 45 and 45a are the separated contacts 49 and 50 which are mounted in the insulating cover 46 and to which are connected the electrical conductors 51 and 52 which lead to the control mechanism of the pump which pumps the liquid for the receptacle 1. This pump and electrical control may be of any of the usual designs for this purpose.

There is a spring 37a which when the magnetic piece 34 is moved out of the field of the magnet 35, moves the magnet and the lever and associated parts back to their initial positions so as to complete the circuit through the pump motor. If desired, a relief valve and pressure gauge of any of the usual types may be attached to the upper part of the receptacle 1.

In Fig. 2 there is illustrated a diagram of the circuits by means of which the motor 53 is connected in circuit with a source of electric supply 55 and 56. When this circuit is completed as above set out, the motor operates the pump 54 to pump liquid into the receptacle, and when the circuit is broken, the motor stops and the pump also stops so that liquid ceases to flow into the receptacle 1.

The use and operation of my invention are as follows.

When the device is being used, the carbon dioxide gas enters the inlet 6 and the water or other liquid enters the inlet 25. The gas passes up through the small openings in the perforated disc 7 and then passes up through the liquid so as to be distributed therethrough and so as to carbonate the liquid. The liquid from the inlet 25 is sprayed through the carbon dioxide gas above the liquid in the receptacle so that it is carbonated by this gas and then it is additionally carbonated when it reaches the body of the liquid in the receptacle by the gas passing through the inlet 6. When the water reaches a predetermined level in the receptacle, the magnetic piece 34 is moved up in proximity with the magnet 35 so that it is attracted thereby and moves downwardly, moving the lever 37 and the member 44 so as to disconnect the contacts 45 and 45a from the contacts 49 and 50, thereby breaking the circuit through the pump motor and the pump which pumps the liquid. The admission of the liquid into the receptacle is therefore stopped.

As the liquid is drawn out, the fluid lowers and when the liquid has reached a predetermined level, the magnetic piece 34 is moved away sufficiently from the magnet 35 so as to release the magnet, whereupon the spring 37a moves the lever and the magnet and the member 44 so as to bring the contacts 45 and 45a into contact with the contacts 49 and 50, so as to complete the circuit through the pump motor 53, which starts up the pump 54 so as to pump liquid into the receptacle. The liquid which is drawn out of the receptacle is drawn out through the pipe 17 near the bottom, so that there is no chance of getting any air mixed with it.

It will be noted that in this construction the gas and liquid inlets are continuously open, that they have no valves associated with them, that there is no valve mechanism forming a part of the receptacle and which controls either the inlet or the outlet, that the control is entirely exterior and that it is not necessary to have any stuffing boxes or packing or other material to connect any moving part in the receptacle with any control member outside of the receptacle. It will also be noted that there is only one moving part inside the receptacle and that is the float. In this device the gas connection is always open and the gas continues to flow into the receptacle until the pressure therein reaches a predetermined point, which is the pressure at which the gas is forced into the receptacle. The liquid is always delivered to the receptacle at the same pressure and this pressure need only be enough higher than the pressure of the gas to inject the liquid into the receptacle at sufficient speed to cause it to be sprayed into the gas at the top of the receptacle. It will further be noted that this device is wholly independent of pressures and can be operated at any pressures desired without any adjustment or change of any kind.

I claim:

1. A carbonating device comprising a receptacle, a gas inlet therefor, a liquid inlet therefor, a float in the receptacle, means for discharging liquid into said receptacle, a magnetic piece within said receptacle and connected with said float, a magnet outside of the receptacle and an electric circuit controlled by said magnet, said electric circuit controlling the means for discharging liquid into the receptacle, said magnetic piece causing said magnet to move and break the circuit and shut off the discharge of liquid into the receptacle when the liquid level in the receptacle reaches a predetermined point.

2. A carbonating device comprising a receptacle, a gas inlet therefor, means for discharging liquid into the receptacle, a liquid inlet therefor, a movable magnet outside of the receptacle for controlling an electric circuit which controls the means for discharging liquid into the receptacle, and a magnetic member inside the receptacle, but always out of contact with said magnet, which actuates the magnet when the liquid level reaches a predetermined point, to cause it to break the circuit and shut off the discharge of liquid into the receptacle.

3. A carbonating device comprising a receptacle, a gas inlet therefor, means for discharging liquid into the receptacle, a liquid inlet therefor, a movable magnet outside of the receptacle for controlling an electric circuit which controls the means for discharging liquid into the receptacle, a magnetic member inside the receptacle, but always out of contact with said magnet, which actuates the magnet when the liquid level reaches a predetermined point, to cause it to break the circuit and shut off the discharge of liquid into the receptacle, and a discharge device for the carbonated liquid in the receptacle, which receives the liquid near the bottom of the receptacle.

JAMES K. LUND.